United States Patent
Dunant et al.

(10) Patent No.: US 12,197,660 B2
(45) Date of Patent: *Jan. 14, 2025

(54) ADAPTIVE SCROLL WHEEL

(71) Applicant: Logitech Europe S.A., Lausanne (CH)

(72) Inventors: Jean-Claude Dunant, Fey (CH); Jan Stoeckli, Jongny (CH); Maxim Vlasov, Geneva (CH); Nicolas Ramond, Lurgrin (FR); Patrick Cerisier, Annecy le Vieux (FR)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,861

(22) Filed: Oct. 5, 2023

(65) Prior Publication Data

US 2024/0036668 A1     Feb. 1, 2024

Related U.S. Application Data

(63) Continuation of application No. 17/881,021, filed on Aug. 4, 2022, now Pat. No. 11,822,739, which is a continuation of application No. 17/334,446, filed on May 28, 2021, now Pat. No. 11,422,643, which is a continuation-in-part of application No. 16/844,846, filed on Apr. 9, 2020, now Pat. No. 11,157,097.

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC ..... G06F 3/0362; G06F 3/03543; G06F 3/038
See application file for complete search history.

(56) References Cited

U.S. PATENT DOCUMENTS

2004/0160415 A1* 8/2004 Rosenberg ............ G05G 9/047
                                                                    345/156
2021/0286448 A1* 9/2021 Dunant ................ G06F 3/0362

* cited by examiner

*Primary Examiner* — Andrew Sasinowski
(74) *Attorney, Agent, or Firm* — Kilpatrick Townsend & Stockton LLP

(57) ABSTRACT

A peripheral device with an adaptive scroll wheel can be used to provide additional control of a host computing device. A variable force is used to change friction on the adaptive scroll wheel for different situations. Examples include stopping a scroll wheel at an end of a document, changing a number of ratchet steps based on a number of items on a list, and changing scroll profiles based on application, such as a scroll profile for document processing and a scroll profile for gaming.

16 Claims, 6 Drawing Sheets

ADAPTIVE SCROLL WHEEL

CROSS-REFERENCE TO RELATED APPLICATIONS

The present application is a continuation of U.S. application Ser. No. 17/881,021, filed on Aug. 4, 2022, entitled "ADAPTIVE SCROLL WHEEL" which is a continuation of U.S. application Ser. No. 17/334,446, filed on May 28, 2021, entitled "ADAPTIVE SCROLL WHEEL" which is a continuation-in-part of U.S. application Ser. No. 16/844,846, filed on Apr. 9, 2020, now U.S. Pat. No. 11,157,097, issued on Oct. 26, 2021, entitled "ADAPTIVE SCROLL WHEEL," which is incorporated by reference for all purposes. U.S. application Ser. No. 17/334,446, filed on May 28, 2022, entitled "ADAPTIVE SCROLL WHEEL" is also a continuation-in-part of U.S. application Ser. No. 16/449,162, filed, on Jun. 21, 2019, entitled "VARIABLE RESPONSE ROTARY INPUT CONTROLS," which claims the benefit of and priority to U.S. Provisional Patent Application No. 62/690,591, filed on Jun. 27, 2018, entitled "ELECTROMAGNETIC MODE CHANGE OF PERIPHERAL INTERFACE WHEEL," which are incorporated by reference for all purposes.

BACKGROUND

Embodiments of this invention are generally directed to a peripheral device controlling a host device. More specifically, and without limitation, this disclosure relates to a computer mouse controlling a computer. A peripheral device can be used to control one or more functions of a host computing device. A computer mouse is an example of a peripheral device. In FIG. 1, an example of a computer mouse 100 is shown. The computer mouse 100 comprises a scroll wheel 104 integrated with a housing 108, and one or more buttons 112. The computer mouse 100, connected to a computer, can be used to select an object (e.g., by clicking button 112) and/or to scroll through a document (e.g., by using scroll wheel 104). An example of a computer mouse is further described in U.S. Pat. No. 6,400,356, issued on Jun. 4, 2002.

BRIEF SUMMARY

In some embodiments, an apparatus for a computer input peripheral device includes a housing; a communication interface integrated with the housing, wherein the communication interface is configured to electronically couple the apparatus with a host computer; a rotatable member integrated with the housing, wherein: the rotatable member is configured to be rotated by a user to control an aspect of the host computer coupled with the communication interface, and/or the aspect of the host computer is traversal of a list comprising a number of elements; a stator integrated with the housing, wherein the stator is configured to apply a force to the rotatable member; and/or one or more processors configured to: ascertain the number of elements of the list, based on the number of elements, and modify the force of the stator on the rotatable member based on the number of elements of the list.

In some embodiments, the one or more processors are further configured to: receive data from the host computer, wherein the data includes a changed number of elements of the list or a new list that is selected; modify the force of the stator based on the changed number of elements of the list or the new list; receive a script command from the host computer, wherein the script command comprises a force profile for the stator to apply to the rotatable member; modify the force of the stator on the rotatable member based on the force profile; receive a current location in the list; map a rotation of the rotatable member to a length of the list; and/or stop rotation of the rotatable member at an end of the list. In some embodiments, the data includes the number of elements on the list has changed beyond a threshold number; the force of the stator on the rotatable member is changed based on the number of elements on the list changing beyond the threshold number; modifying the force changes a number of ratchet steps based on a reduced number of items on the list; modifying the force stops rotation in one direction of the rotatable member at an end of the list; the force profile comprises a force function for a ratchet step; the force function is asymmetrical; the force profile maps a plurality of ratchet steps to one rotation of the rotatable member; the stator is part of an electromagnet used to apply a magnetic force to the rotatable member; and/or the apparatus receives through an application program interface a number of elements in a new list after the new list is selected.

In some embodiments, a method includes receiving, from a host computer, a list comprising a number of elements; ascertaining the number of elements on the list; measuring a rotation of a rotatable member in relation to a stator of an input peripheral device electronically coupled with the host computer, wherein the rotatable member is configured to be rotated by a user to control an aspect of the host computer; modifying a force of the stator on the rotatable member based on the number of elements of the list; transmitting to the host computer an indication of traversal of the list based on measuring the rotation of the rotatable member; receiving data, from the host computer, comprising an indication of a preset; and/or modifying the force of the stator on the rotatable member further based on the preset.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The detailed description is set forth with reference to the accompanying figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

While a scroll wheel on a computer mouse has been used for some functions, the scroll wheel typically has standard, pre-defined, consistent scroll steps (sometimes referred to as ratchet steps). However, modifying a force on the scroll wheel can enable more efficient, and/or more intuitive, user interaction with a computer. For example, ratchet steps can be lengthened or shortened (e.g., for faster or slower scrolling speeds), an amount of force between ratchet steps can be changed (e.g., greater force for higher-precision tasks), and/or the scroll wheel can be stopped (e.g., when a user gets to an end of a list/document). By modifying the force on the scroll wheel, functioning of the scroll wheel can be dynamically changed based on context.

Figure 1:
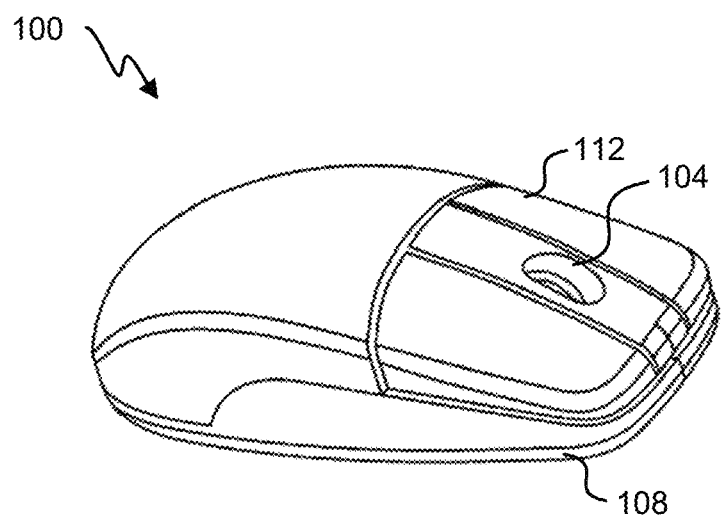
FIG. 1 shows an example of a computer mouse.
Figure 2:
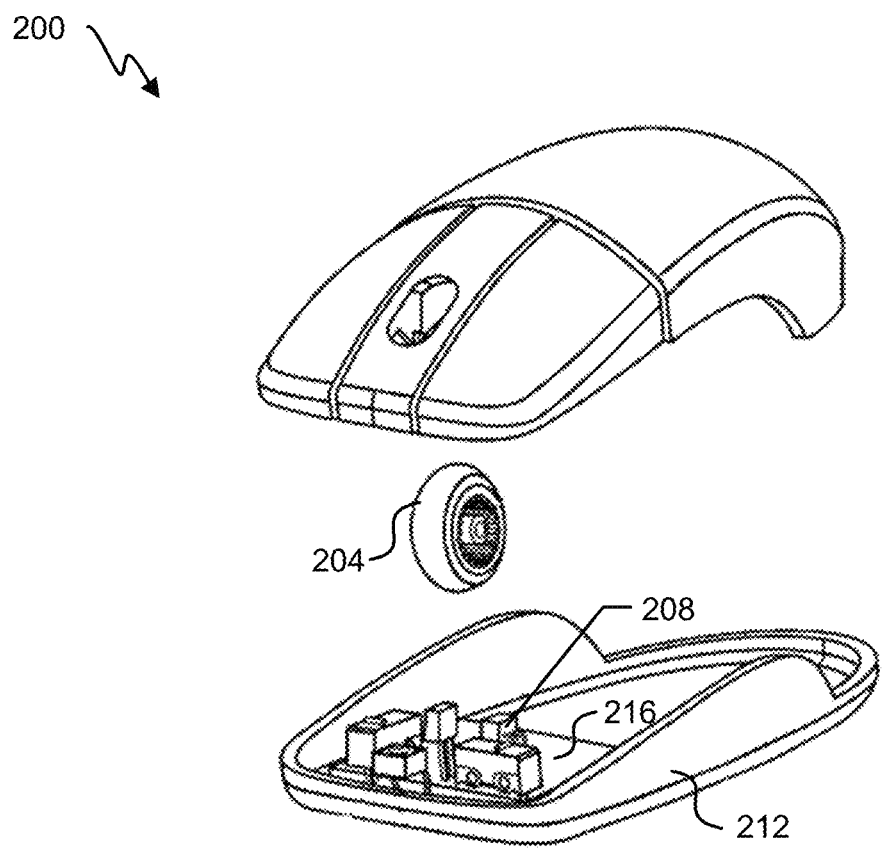
FIG. 2 shows an embodiment of a mouse with an adaptive scroll wheel.

FIG. 2 is an embodiment of a mouse 200 having an adaptive scroll wheel. The mouse 200 comprises scroll wheel 204, a stator 208, and a housing 212, wherein the scroll wheel 204 and the stator 208 are integrated with the housing 212. The mouse 200 further comprises a circuit board 216 integrated with the housing. The circuit board 216 comprises a communication interface to electronically couple the mouse 200 with a host computer (e.g., by using a wired or wireless connection), one or more memory storage devices, and/or one or more processors.

The scroll wheel 204 can be a rotatable member. The scroll wheel 204 can be configured to be rotated by a user to control an aspect of the host computer. For example, the scroll wheel 204 can be configured to traverse a list comprising a number of elements as the user rotates the scroll wheel 204.

The scroll wheel 204 rotates in relation to the stator 208. The stator 208 can be configured to apply force on the scroll wheel. The force on the scroll wheel 204 can be modified to allow different types of control of the host computer and/or feedback to the user. In some embodiments, the stator 208 comprises a solid state electromechanical device having an electromagnet to apply a force on the scroll wheel 204 (e.g., instead of mechanical gearing). The scroll wheel 204 can comprise magnetic or ferrous material to interact with the electromagnet of the stator 208 (e.g., the electromagnet of the stator 208 applies a magnetic force on the scroll wheel 204 to make the scroll wheel 204 more difficult to rotate). The solid state electromechanical force applied by the stator 208 on the scroll wheel 204 can be changed electronically (e.g., by electronics on the circuit board 216) to provide dynamic and/or customizable actions.

The mouse 200 includes a rotation sensor for sensing rotation of the scroll wheel 204. The rotation sensor can be a mechanical, magnetic, capacitive, inductive, and/or optical sensor. The rotation sensor can be part of the stator 208. Electronics integrated on the circuit board 216 interpret a signal from the rotation sensor to determine a scroll event. The scroll event can be a hit command (e.g., scroll up or scroll down). Force on the scroll wheel 204 can be changed to modify a hit command (e.g., to change an angle of rotation of the scroll wheel 204 for a hit command). Thus the mouse 200 for a first application could transmit one hit command to the host computer for a first rotation length (e.g., 1/17th rotation of the scroll wheel 204) and then transmit one hit command to the host computer for second rotation length (e.g., 1/7th rotation of the scroll wheel) for a second application.

Figure 3:
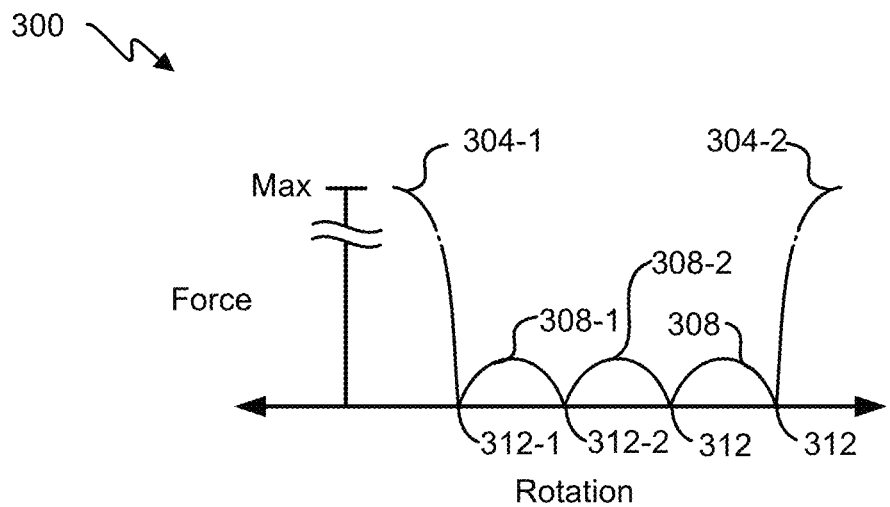
FIG. 3 depicts a sample chart of force in relation to rotation of the adaptive scroll wheel for a list having four elements.

FIG. 3 depicts a sample chart 300 of force in relation to rotation of the scroll wheel 204 for a list having four elements. The chart 300 depicts a force profile having a first stop 304-1, a second stop 304-2, and three steps 308. Between stops 304 and steps 308 are positions 312. For example, a first position 312-1 is between the first stop 304-1 and a first step 308-1; a second position 312-2 is between the first step 308-1 and a second step 308-2; and so on. The force can be a relative amount of force of the stator on the scroll wheel, which can correspond to an amount of effort to move the scroll wheel (e.g., friction). In some embodiments the force can include the stator actively moving the scroll wheel (e.g., for providing haptic feedback; such as rapidly rotating the scroll wheel back and forth +/−3, 5, 10, or 15 degrees to indicate a character in a video game is taking damage, wherein rapidly can be 10, 20, 30, 50, or more movements per second). Other examples of haptic feedback can include notifying a user that a new list is selected, an item on the list has changed, a message (e.g., a new email or gaming message) is received, etc.

In some embodiments, the stop 304 prevents the scroll wheel 204 from moving in one direction in relation to the stator 208 under normal use. The stop 304 can be 3, 5, or 10 times the force of a step 308. A force profile can change as a list changes in a host computer. A list can be a document, a web page, a weapon selection, a graphic, etc. The elements in the list can be a number of pages, a number of paragraphs or lines, a number of scrollable views, a number of weapons, etc. A list can be represented by a single dimensional array with a variable number of elements in the list. A physical feel of scrolling with the scroll wheel can change based on elements of the list, changes to the list, a type of list or application (e.g., a document for editing, a tool in editing software, a tool in photo-editing software, navigating in a computer game, weapon selection in a computer game, etc.), a user profile (e.g., preference selected by a user, where a user could configure a magnitude of a force of a step 308 to be higher or lower depending on preference), and/or a set of profiles (e.g., a user could select from a set of profiles and/or modify the set of profiles; e.g., the set of profiles can include "web browsing," "gaming," "photo editing," etc., and a user can switch between profiles).

For example, the force profile in chart 300 could correspond to the list in Table A below.

TABLE A

| Element | Item |
|---------|------|
| 1 | Fists |
| 2 | Knife |
| 3 | 308 Rifle |
| 4 | MANPADS |

The list in Table A is an embodiment of a list from a menu in a video game for different objects to use. The list in Table A comprises four element: a first element, "Fists"; a second element, "Knife"; a third element, "308 Rifle"; and a fourth element, "MANPADS." MANPADS stands for man-portable air-defense system. The list in Table A can be a number of weapons available to a user of a video game running on a host computer.

The scroll wheel 204 in FIG. 2 can used to traverse the list in Table A according to chart 300. For example, the first element on the list is selected while the rotation of the scroll wheel is at the first position 312-1, the second element on the list is selected while the rotation of the scroll wheel is at the second position 312-2, and so on so that there are four elements on the list and there are four positions 312.

In chart 300, a left rotation corresponds to a "forward" or "up" rotation of the scroll wheel (e.g., a rotation of a top of the scroll wheel away from a user's hand while the user is holding the mouse, where a top of the scroll wheel is a portion of the scroll wheel exposed to a user to touch during normal operation of the mouse). A rotation to the right in chart 300 corresponds to a "backwards" or "down" rotation of the scroll wheel (e.g., a rotation of a top of the scroll wheel towards the user's hand while the user is holding the mouse). Accordingly, the force on the scroll wheel by the stator stops rotation of the scroll wheel under normal use.

The force of the stator on the scroll wheel can be modified to stop rotation of the scroll wheel in one direction at an end of the list. For example, if the first element on the list in Table A is selected, and as the user rotates the scroll wheel up, then the scroll wheel will stop. As visualized in chart 300, the scroll wheel is at the first position 312-1 while the first element is selected, as the user rotates the scroll wheel up (left in chart 300), then the force of the stator on the scroll wheel increases until the first stop 304-1. The rotation of the scroll wheel is also stopped at the other end of the list (e.g., rotation of the scroll wheel is stopped in the direction of down/right by the second stop 304-2 after the fourth element). By stopping the scroll wheel in relation to the list, a user can know which element is selected relatively quickly, without looking at the list on a screen, by rotating the scroll wheel a few clicks in either direction. This can allow the user to focus more on action in the video game rather than trying to see in a menu which weapon is selected.

The scroll wheel can also be stopped at one or more ends of other lists. For example, the scroll wheel can be stopped at ends of documents (e.g., at the first page and the last page); a list corresponding to volume (e.g., the scroll wheel stops at maximum and minimum volumes, such as for listening to music); a list corresponding to shade (e.g., in photo-editing, the scroll wheel can be rotated to change a shade of an area selected, and the scroll wheel stops at full black or full white); etc.

In some embodiments, one or more processors (e.g., processor(s) in the mouse and/or in the host computer) can be configured to receive a current location in the list (e.g., an indication that the first element in Table A is currently selected); map a rotation of a rotatable member (e.g., the scroll wheel) to a length of the list (e.g., identifying a rotation position, such as the first position 312-1 as the current location in the list based on four elements on the list); and stop rotation of the rotatable member at an end of the list (e.g., stop rotation of the scroll wheel as the scroll wheel is rotated forward).

Figure 4:
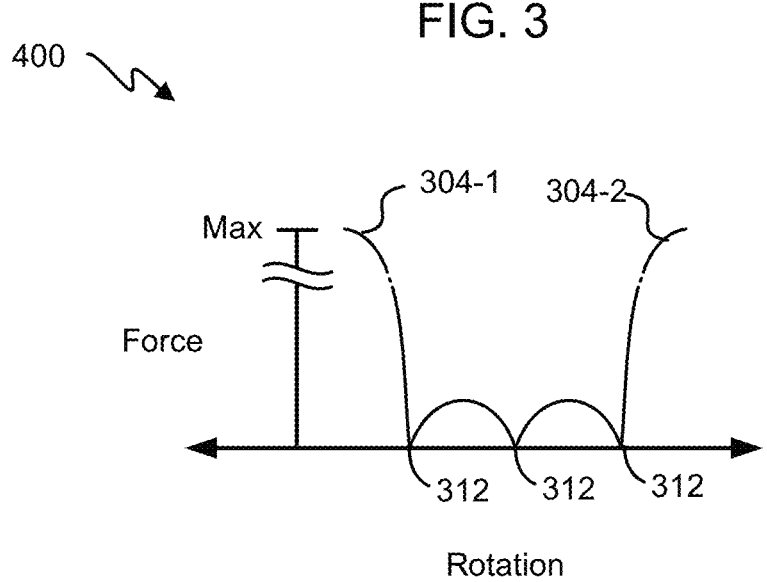
FIG. 4 depicts a sample chart of force in relation to rotation of the adaptive scroll wheel for a list having three elements.

FIG. 4 depicts a sample chart 400 of force in relation to rotation of the adaptive scroll wheel for a list having three elements. Force applied to the scroll wheel can be modified as a list is modified (e.g., modifying the force on the scroll wheel 204 based on a number of elements in the list). In the example of a computer game, if a weapon is dropped (or is inoperable, such as by lack of ammunition), such as the MANPADS, then Table A could be modified to be Table B below.

TABLE B

| Element | Item |
|---------|------|
| 1 | Fists |
| 2 | Knife |
| 3 | 308 Rifle |

Table B contains only three elements. Data about the list changing can be transmitted from the host computer to the mouse. The force profile can be changed (e.g., to the force profile in chart 400) based on the reduced number of elements on the list. Instead of four positions 312 in chart 300, there are only two ratchet steps (e.g., three positions 312) in chart 400 between the first stop 304-1 and the second stop 304-2. Thus the force profile of the stator on the scroll wheel can be changed (e.g., change a number of ratchet steps) based on the number of items on a list. In another example, the force profile can be changed if the number of elements on the list is changed beyond a threshold number. For example, a first force profile could be used for documents having 1-5 pages, a second force profile for documents having 6-20 pages; a third force profile for documents having 21-50 pages, fourth force profile for documents having 51-100 pages, and a fifth force profile for documents having 101 pages or more. Thus, if a page was added to a document (e.g., word processing document or a presentation slide deck), and a new number of pages was 51, then the force profile would change.

Figure 5:
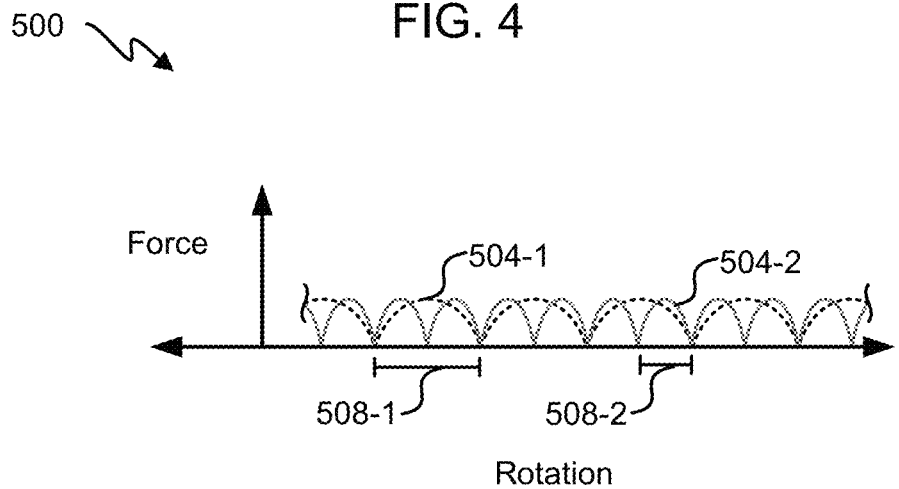
FIG. 5 depicts a sample chart of force in relation to rotation of the adaptive scroll wheel for changing ratchet-step spacing.

Force profiles can be changed in many ways for the adaptive scroll wheel. FIG. 5 depicts a sample chart 500 of force in relation to rotation of the adaptive scroll wheel for changing ratchet-step spacing. Chart 500 compares a first force profile 504-1 (dashed line) to a second force profile 504-2 (solid line). The first force profile 504-1 has a first step spacing 508-1. The second force profile 504-2 has a second step spacing 508-2. The first step spacing 508-1 is larger than the second step spacing 508-2. Accordingly, the second force profile 504-2 has more ratchet steps per rotation of the scroll wheel than the first force profile 504-1. Though the first step spacing 508-1 is an integer multiple of the second step spacing 508-2 in FIG. 5, using integer multiples is not required; sometimes non-integer multiples are used. Step spacing 508 can be adjusted based on user preference, application, list, and/or profile. In some embodiments, the number or ratchet steps per rotation of the scroll wheel can be based on a number of items on a list. For example, if there are more items on the list, then the step spacing 508 can be smaller than if there are less items on the list. Put another way, the force profile 504 can be modified to map a number of ratchet steps to one rotation of a rotatable member (e.g., based on list length). In a limit where the step spacing 508 approaches zero, the scroll wheel is in freewheeling mode. The force can be increased or decreased in freewheeling mode (e.g., the force profile for freewheeling mode could be represented by a line of force=constant, and a value of the constant can be increased or decreased to change friction on the scroll wheel). Step spacing 508 can be dynamically changed. Step spacing 508 can be increased (or decreased) linearly, exponentially, logarithmically, quadratically, cubically (or higher), etc. For example, for navigating in a geographic information system (GIS) map, the step spacing 508 could be larger for a view that is "zoomed out" (e.g., for less accurate steps), and step spacing 508 decreases as a user "zooms in" (e.g., for more accurate steps). Changing step spacing 508 in relation to rotation of the scroll wheel can in used in addition to, or in lieu of, changing an amount of movement per hit command. For example, one large step spacing 508 could "zoom" as much or more than 2, 3, 5, 10, 15, or 20 smaller step spacing 508, even though the smaller steps added together have the same rotation angle of the scroll wheel as the large step. In some embodiments, an amount of movement (e.g., zoom and/or translation) on the host computer can be related to step spacing 508. For example, the first step spacing 508-1 could move a page displayed on a host computer by 1 cm, whereas the second step spacing 508-2 could translate the page by 1 mm, even though two of the second step spacing 508-2 is equal to the same amount of rotation of the scroll wheel as one of the first step spacing 508-1.

Figure 6:
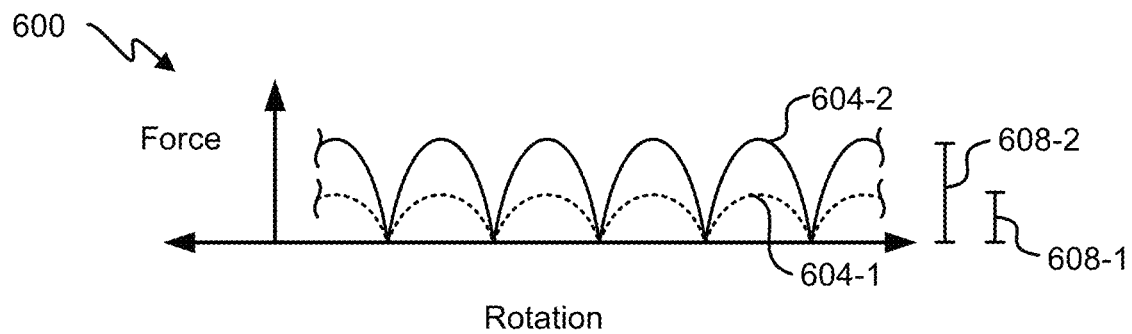
FIG. 6 depicts a sample chart of force in relation to rotation of the adaptive scroll wheel for changing resistance of ratchet steps.

FIG. 6 depicts a sample chart 600 of force in relation to rotation of the adaptive scroll wheel for changing resistance of ratchet steps. Chart 600 compares a first force profile 604-1 (dashed line) to a second force profile 604-2 (solid line). The first force profile 604-1 has a first step magnitude 608-1. The second force profile 604-2 has a second step magnitude 608-2. The first step magnitude 608-1 is less than the second step magnitude 608-2. Accordingly, the scroll wheel takes more effort to rotate for the second force profile 604-2 than the first force profile 604-1. Though the second step magnitude 608-2 is an integer multiple of the first step magnitude 608-1 in FIG. 6, using integer multiples is not required. Step magnitude 608 can be adjusted based on user preference, application, list, and/or profile. For example, step magnitude 608 could be lower for movement of a character in a game and higher while selecting a weapon in the game. Thus a user could know by feel what parameter is being changed in an application (e.g., in a game). In another embodiment, long documents could have lower step magnitude (e.g., lighter friction) and shorter documents could have higher step magnitude (e.g., stronger friction). In some embodiments, force of the stator on the rotatable member does not return to zero between steps.

Figure 7:
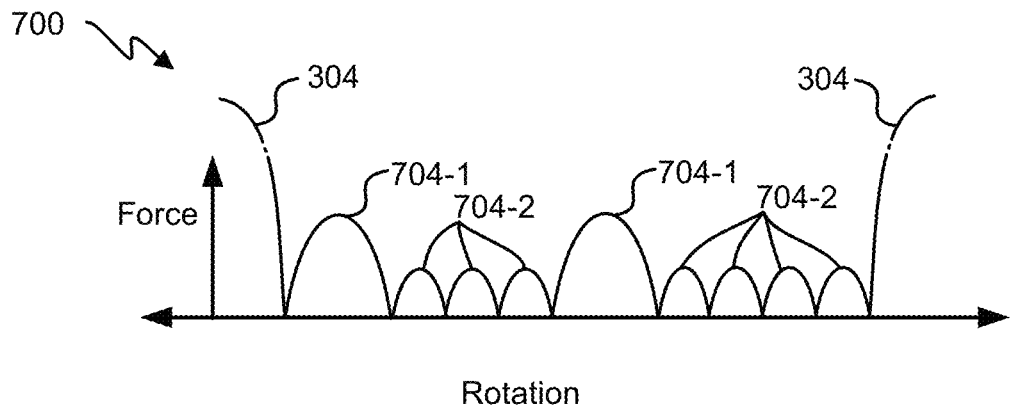
FIG. 7 depicts an embodiment of a force profile for a list having main headings and sub headings.

Step profiles can be mixed, matched, and varied. For example, FIG. 7 depicts an embodiment of a force profile for a list having main headings and sub headings. In FIG. 7, a chart 700 shows a force profile having a first step type 704-1 and second step type 704-2 between stops 304. The first step type 704-1 has a longer step length and higher magnitude than the second step type 704-2. The first step type 704-1 can be used for a major heading(s) in a list and the second step type 704-2 can be used for a minor heading(s) in the list. In chart 700, the force profile corresponds to a list with two major heading and seven subheadings. In another example, the first step type 704-1 could be used for page breaks in a document and the second step type 704-2 could be used for scrolling through a page of the document. Different step types 704 can provide feedback to a user for where in a list the host computer is at, which can aid the user in navigating through the list. In a further example, the first step type 704-1 could be used at multiples of 10% for changing shade of an area while editing a photo. Thus if a user wanted to darken an area by twenty percent from black, then the user could scroll the scroll wheel down until the user felt two of the first step type 704-1. Even though only two step types 704 are shown, more step types 704 could be used depending on the application, the type of list, user preference, and/or profile types. For example, three, four, five, six, or more step types 704 could be used in one force profile.

Figure 8:
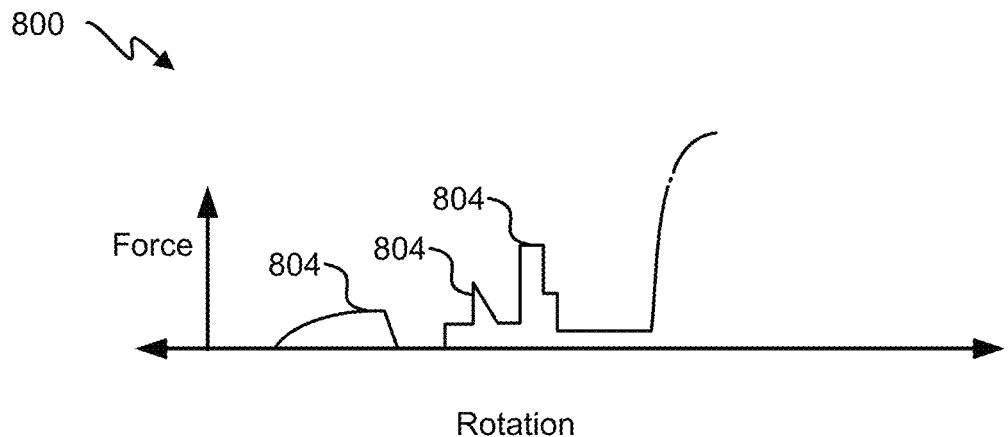
FIG. 8 depicts various embodiments of asymmetric force profiles.

FIG. 8 depicts an embodiment of an asymmetric force profile. Chart 800 comprises various step profiles 804. The step profile 804 can be a force function for a ratchet step. Though step profiles in charts 500, 600, and 700, are smooth "bumps", the step profiles 804 in chart 800 are not. Step profiles 804 can have varying magnitude (e.g., how hard the friction is on the scroll wheel) and shape. Step profiles 804 are asymmetrical. Asymmetrical step profiles could be used to enhance feel for different challenges in games. For example, if a person was to pick a lock in a game, a step profile 804 could be used to simulate force of different tumblers in the lock. Various step profiles 804 can provide increased use of the scroll wheel for various different tasks.

In some embodiments, a scrolling profile can be classically defined (e.g., 24 ratchet steps per revolution of the scroll wheel and with a typical force), or defined by some other force profile, and a host computer can send a request for temporary increased and/or decreased force (e.g., on the fly). This could be used for haptic-type feedback that could alert a user to a notification, a keyword in a viewable area, grammar/orthographic mistake in a viewable area, an advised tool based on context (e.g., in photo editing software), etc. Changing force on the scroll wheel (e.g., force is very large when a cursor is above or near a searched item) can simplify and/or quicken a search. Force can be reduced, and/or an amount of scroll per revolution of the scroll wheel changed, based on the host computer. For example, a user could "zip" through an advertisement or a form agreement to facilitate a user to more quickly navigate through an article or the form agreement. For example, force on the scroll wheel is reduced and/or an amount of scroll distance on the host computer increased per ratchet step of the scroll wheel when there is an advertisement or when a popup box with terms of service is presented to the user. In another example, lighter force could be applied to the scroll wheel until comments directed to the user reach an end, or until a last unread message is reached (e.g., in forums, comment sections, etc.). On-the-fly communication from the host computer to the mouse allows context-based notification to the user.

Figure 9:
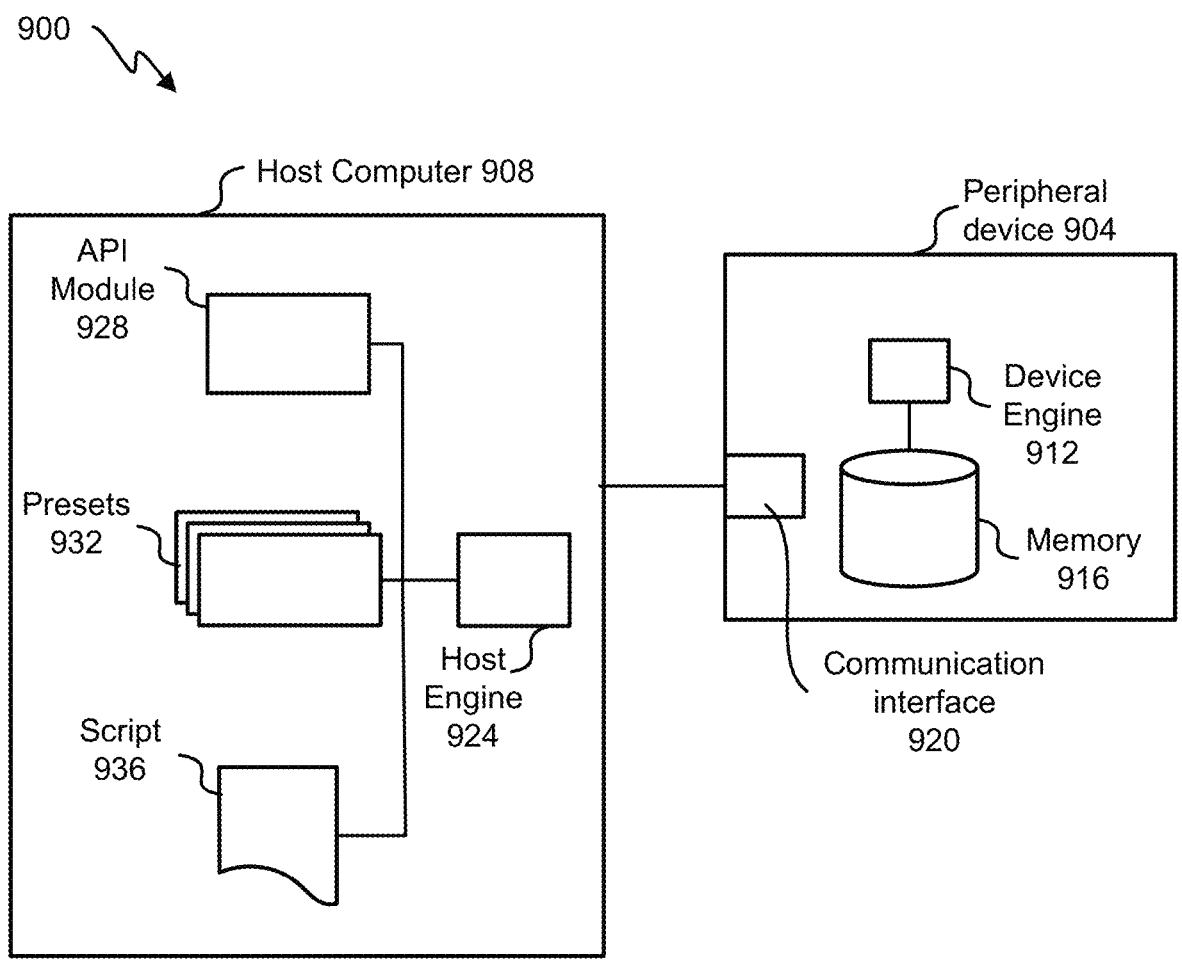
FIG. 9 is a block diagram of an embodiment of a system using an adaptive scroll wheel.

FIG. 9 is a block diagram of an embodiment of a system 900 using an adaptive scroll wheel. The system 900 comprises a peripheral device 904 and a host computer 908. The peripheral device 904 can be used to control one or more functions on the host computer 908 (e.g., scrolling through a list displayed on the host computer).

The peripheral device 904 comprises a rotatable member (e.g., a wheel) configured to rotate in a plane perpendicular to a collocated surface (e.g., a scroll wheel in a mouse). Though a computer mouse is provided as an example, the scroll wheel could be located on a peripheral other than a mouse. For example, the rotatable member could be a part of a keyboard (e.g., on a gaming keyboard), remote control, steering wheel, joystick, headphones, etc. The rotatable member can be a wheel on a mouse (e.g., scroll wheel positioned to be rotated by a user's middle finger or a thumb wheel, configured to be rotated by the user's thumb). The rotatable member can be a knob (e.g., a knob on Logitech's G29 Driving Force racing wheel or shifter).

The peripheral device 904 can comprise a device engine 912, memory 916, and/or a communication interface 920. The device engine 912 comprises one or more processors to control functioning of the peripheral device 904. An example of the device engine 912 includes a processor on the circuit board 216 in FIG. 2. The communication interface 920 can be used to electronically couple the peripheral device 904 to the host computer 908 (e.g., so that data can be transmitted from the peripheral device 904 to the host computer and/or data from the host computer 908 to the peripheral device 904). For example, the communication interface comprises a universal serial bus connection and the peripheral device 904 can be electronically coupled with the host computer 908 by the universal serial bus connection (a wired connection). In another example, the communication interface 920 comprises an antenna for a wireless connection to the host computer 908 (e.g., Bluetooth).

The host computer 908 comprises a host engine 924. The host engine 924 comprises one or more processors to control functioning of the host computer 908 and/or the peripheral device 904. An API (application programming interface) module 928, presets 932, and/or a script 936 can be used by the host engine 924 to change force profiles of the peripheral device 904. In some embodiments, presets 932 are saved on the peripheral device 904 in the memory 916.

In some embodiments, the peripheral device 904 receives only a length of a list and a position within the list (e.g., the host computer 908 lets the mouse know where the mouse is currently positioned in relation to the list. In some embodiments, the peripheral device 904 can extract information about the list from the host computer 908. For example, the peripheral device 904 scrapes a screen of the host computer 908, extracts screen contact, on/off, flow, and/or limiter of page to determine what the list is and/or the position of the peripheral device 904 in relation to the list.

The peripheral device 904 can make information available to the host engine 924. For example the peripheral device 904 can transmit to the host engine 924 rotation angle of the rotatable member, force applied to the rotatable member, and/or a force profile currently being used by the peripheral device 904. Thus the host computer 908 and the peripheral device 904 can exchange information. However, exchanging a lot of information can cause a lag in performance of the peripheral device 904. Thus in some embodiments, the host engine 924 sends data to the device engine 912 where the peripheral device 904 is in relation to a list, and then there can be only one-way data transmission from the peripheral device 904 to the host computer 908 until a user makes a selection (e.g., by clicking a button on a mouse or pressing a key on a keyboard); the peripheral device 904 tracks its own position in the list during one-way data transmission to the host computer 908.

In some embodiments, the host computer 908 has full control of the peripheral device 904. For example, the host engine 924 can instruct the device engine 912 when to change an item, when an end of a list is reached, when to change a profile, etc. An advantage of full control by the host computer 908 can be that software can be very dynamic. However, having full control of the peripheral device 904 by the host computer 908 can increase data transmission between the peripheral device 904 and the host computer 908, which can cause lag that can be felt by the user. Presets 932, and/or a script 936 can be used to pass information to the device engine 912 to perform processing so that lag can be reduced. Though the API module 928, a preset 932, and a script 936 can be used individually, a combination of two or all three can be used.

An API can be used to provide data to the peripheral device 904. The API can be used to provide data such as when a new list is selected, number of elements on the list (e.g., length of the list), change of a number of elements on a list (e.g., above or below a threshold value), stops (e.g., stops 304 as described in FIG. 3), top of the list, bottom of the list, desired torque (e.g., force and/or parameters defining a force profile such as step magnitude and length); force profile changes (e.g., lighter force for zoom steps and stronger force for weapon selection; or lighter force for document processing and stronger force for gaming); and/or haptic feedback. The API can include various commands to enable software to "build" a force profile. In some embodiments, a tactical screen interface can be used to provide information from the host computer 908 to the peripheral device 904 (e.g., outputting a list of choice of weapon to the mouse). The mouse could then respond to the host engine 924 by transmitting hit commands. Though the API can provide full control of wheel behavior, there can be significant communication between the host computer 908 and the peripheral device 904 (e.g., so the peripheral device 904 knows where it is at in the list), which can cause lag in some situations.

A script 936 can be used to provide script commands to the peripheral device 904. The script can provide more finite control over the rotating member, such as a unique, non-symmetrical profile. The script 936 can include a force profile (e.g., a force profile for the stator 208 to apply to the scroll wheel 204 in FIG. 2). The device engine 912 then uses the script 936 (e.g., a force profile from the script 936) to change friction on the rotatable member of the peripheral device 904. The script 936 can be uploaded to the memory 916 of the peripheral device 904 so that while behavior of the peripheral device 904 is dictated by the script 936, the peripheral device 904 does not receive data from the host computer 908; and response of the peripheral device 904 can be quick and precise (e.g., for complex force profiles depicted in FIG. 8).

Using the script 936 can introduce some safety concerns (e.g., concerns about accessing memory 916 of the peripheral device 904). Accordingly, in some embodiments, the script 936 contains only commands from a set list of commands that access known functions on the mouse (e.g., unknown commands are ignored by the mouse). Examples of known functions can include functions to change an amount of force depending on a position of the scroll wheel relative to a ratchet location (e.g., force is higher between positions 312 in FIG. 3, where positions 312 correspond to ratchet locations), stops (e.g., stops 304 in FIG. 3), and/or conditional functions to, for example, to change a number of ratchet steps (e.g., changing a number of positions 312 in FIG. 4 compared to FIG. 3), to implement a preset, and/or to have scrolling up have more force between ratchet steps than scrolling down. In other embodiments, the script 936, or other data sent to the mouse from the host computer, can be used to have direct access to the mouse. A translation layer can be used by the device engine 912, which can take time, so scripts 936 are kept short in some embodiments.

In some embodiments, the script 936 is transmitted to the peripheral device 904 for a mini game. For example, when a user playing a game selects a "Pick the lock" button, the host computer 908 plays an animation of getting closer to a door and opening a toolkit. During the animation, a script 936 for an asymmetric force profile (e.g., a "lock pick"

script) is transmitted from the host computer 908 to the peripheral device 904, and/or implemented by the device engine 912, so that the peripheral device 904 is ready to work without communication from the host computer 908 at the start of the mini game of picking the lock. In some embodiments, the peripheral device 904 does not receive communication from the host computer 908 until after the peripheral device 904 sends a communication to the host computer 908 that the script is completed. Before sending the communication that the script is completed, the peripheral device 904 can send communication (e.g., one-way communication) to the host computer 908 for particular events (e.g., scroll events; button events; movement events; etc.).

The Script 936 can be sent in conjunction with a list and/or other data (e.g., with data from the API module 928 and/or an indication of a preset 932). The script 936 could be used for unique situations, such as in a mini-game (e.g., for lock picking).

Presets 932 can be used to provide a user specific control of the host computer 908 by the peripheral device 904. A preset 932 can be a set of parameters for the peripheral device 904 to implement (e.g., a set of parameters defining a force profile). Parameters can include: a number of ratchet steps per rotation, length of ratchet step(s), and/or shape "shape" of ratchet steps. When the host computer 908 indicates a first preset 932 is to be used, the peripheral device 904 can implement the first preset 932 from memory 916 without lengthy communication between the host computer 908 and the peripheral device 904. The peripheral device 904 can then report back to the host computer 908 each ratchet step to the host computer 908 without the peripheral device 904 knowing what is happening on the host computer 908. The peripheral device 904 can receive an indication of a second preset 932 and implement the second preset from memory 916.

In some embodiments, a user can use a program running on the host computer 908 to refine presets 932. For example, a user may want a certain profile depending on whether they are looking at a document verses playing a game. The user may want to select a different profile based on the number of elements in a list or if the mouse is in a different mode (e.g., ratchet, freewheel, gaming, etc.). The user can personalize one or more presets 932 (e.g., by specifying step length, ratchet force, overall friction, etc.). A force profile could be set up so force is lowered for certain objects (e.g., while web browsing, light friction is used when an advertisement banner is reached and higher friction for body text so that the advertisement banner is more easily skipped). A preset 932 could be used with an API. For example, the host computer 908 could send an indication to the peripheral device 904 to implement a preset 932 that is good for reading a document, and then send a LOCK command when an end of the document is reached (e.g., the LOCK commend prevents the scroll wheel from being rotated; similar to a stop 304 in FIG. 3).

The peripheral device 904 can enter into a power-saving mode to reduce communication with the host computer 908. For example, the peripheral device 904 can implement a "basic mouse" profile, where the "basic mouse" profile does not receive data from the host computer 908 but simply sends scroll hits to the host computer 908 based on a set number of ratchet steps per revolution of the scroll wheel. In power-saving mode, the peripheral device 904 could be limited to receiving limited data from the host computer 908, such as receiving a list and a position in the list (e.g., and no API data or script data). Thus the peripheral device 904 can operate in a first mode and receive script data and operate in a second mode and not receive script data.

Figure 10:
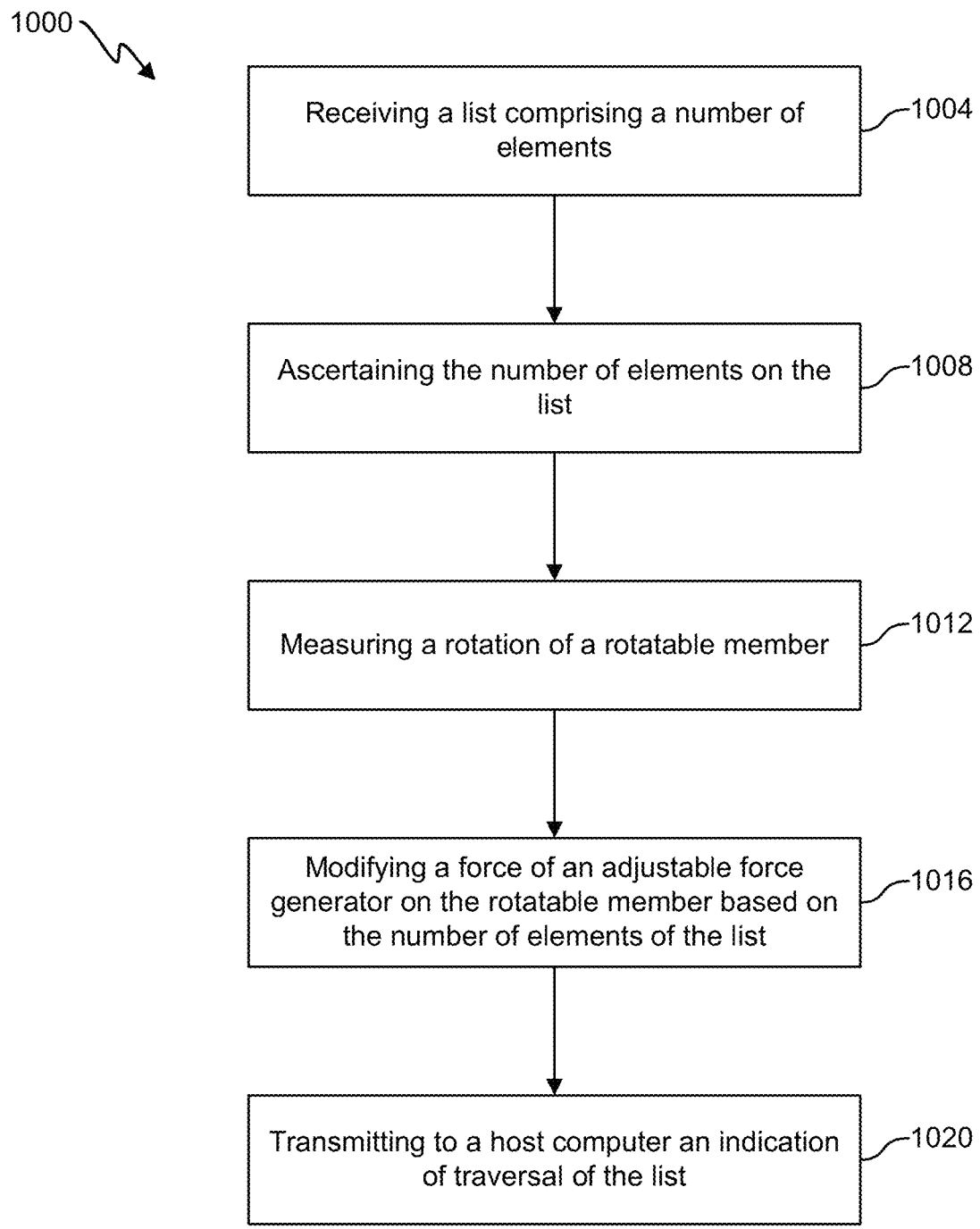
FIG. 10 illustrates a flowchart of an embodiment of a process for using an adaptive scroll wheel.

FIG. 10 illustrates a flowchart of an embodiment of a process 1000 for using an adaptive scroll wheel. Process 1000 begins in step 1004 with receiving from a host computer a list comprising a number of elements. For example, the peripheral device 904 receives the list in Table A from the host engine 924 in FIG. 9. In step 1008, the number of elements on the list is ascertained. For example, a peripheral device could count the number of elements on the list, or the peripheral device could receive a number from the host computer indicating the number of elements on the list. In some embodiments, the number of elements can be a number of pages in a document.

The peripheral device measures a rotation of a rotatable member in relation to an adjustable force generator, wherein the rotatable member is configured to be rotated by a user to control an aspect of the host computer, step 1012. For example, the peripheral device can be a mouse (e.g., mouse 200 in FIG. 2) and the rotatable member can be a scroll wheel of the mouse. The adjustable force generator can include a mechanical mechanism, magnetorheological fluid, an electromagnetic, etc. The stator 208 in FIG. 2 can refer to a stationary portion (e.g., stationary in relation to the housing 212 of the mouse 200) of the adjustable force generator.

In Step 1016, a force of the adjustable force generator on the rotatable member can be modified based on the number of elements of the list. For example, a force profile in chart 300 of FIG. 3 can be used as a user scrolls through the list of Table A. In step 1020, an indication of traversal of the list is transmitted to the host computer based on measuring the rotation of the rotatable member. The host computer then changes a view of a screen and/or a selection based on the indication of traversal of the list by the peripheral device.

The peripheral device can receive a user profile from the host computer and modify the force of the adjustable force generator on the rotatable member based on the user profile received from the host computer. For example, user profile may indicate the user prefers less force on the scroll wheel of a mouse and thus change from the second force profile 604-2 in FIG. 6 to the first force profile 604-1 in FIG. 6. The user profile can be part of a preset. For example, a preset can modify a force of the adjustable force generator on the rotatable member depending on a force requested by the host computer or depending on a number of elements in the list.

The peripheral device can ascertain a number of elements of a list (e.g., based on the number of elements by counting the number of elements of the list) and modify the force of the adjustable force generator on the rotatable member based on the number of elements of the list. In some embodiments, the peripheral device receives data from the host computer that includes a new list or the number of elements of the list has changed, and modifies the force of the adjustable force generator based on the new list or the number of elements of the list changing. For example, the peripheral device could receive the list in Table B, after having received the list in Table A, and modify the force profile from the chart in FIG. 3 to the chart in FIG. 4.

In certain embodiments, the peripheral device can determine whether the scroll wheel is relatively stationary before modifying a force profile applied to a rotatable member in order to prevent a transition from being jarring to a user. For example, the peripheral device can receive data indicating that a number of elements in a list has changed or that a new list has been selected to be controlled by a scroll wheel and thus a force applied to the scroll wheel should change. The peripheral device can que the change in force and apply it after the scroll wheel is determined to be relatively stationary. In order to save power, the peripheral device can wait until it detects a variation of position of the rotatable member before applying a force to the rotatable member, thus saving power between interactions. The variation of position before the force is applied could be based on usage. For example, if the user keeps turning the scroll wheel, an amount of variation (sometimes referred to delta) is reduced to enhance user experience; if the scroll wheel is idle for a period of time (e.g., 2, 3, 5, 10, or 15 seconds), then the delta is increased.

In certain embodiments, the peripheral device can store, in internal memory, one of several force profiles each corresponding to a respective list controlled by a scroll wheel. For example, as a user uses the peripheral device to move a cursor on a display, several different lists may be traversed by the cursor. The scroll wheel may be configured to control a list that the cursor is currently hovering on top of. The host computer can send a data reference to command the peripheral device to switch between one of several internally stored force profiles depending on a position that the cursor is currently positioned over. When transitioning between force profiles, the peripheral device may create an intermediate profile to provide a more gradual transition between the profiles when switching between them. For example, the peripheral device may determine that a difference between respective forces in different force profiles (occurring at the same time and/or in response to similar criteria) is greater than a threshold value and, if so, create an intermediate profile that includes an average of the forces. Several different intermediate forces can be generated and applied successively over time. For example, a user may specify, via their profile, a maximum gradient change between force profiles. When comparing two force profiles, the peripheral device can divide a difference between respective forces to generate multiple intermediate forces, each less than the user specified maximum gradient change.

Figure 11:
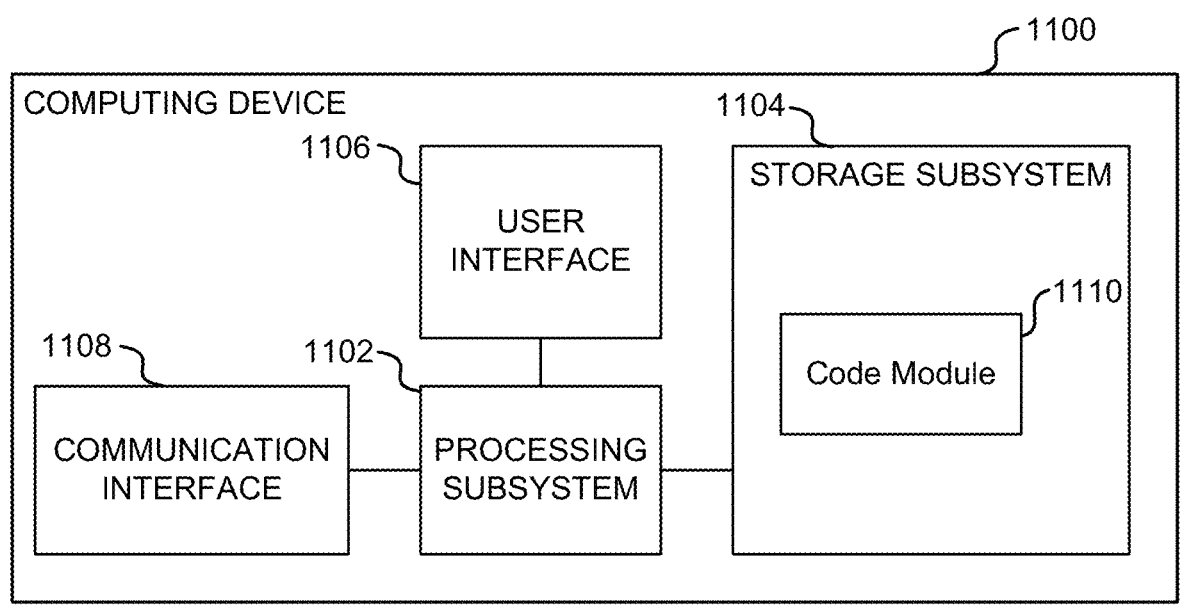
FIG. 11 depicts a block diagram of an embodiment of a computer system.

FIG. 11 is a simplified block diagram of a computing device 1100. Computing device 1100 can implement some or all functions, behaviors, and/or capabilities described above that would use electronic storage or processing, as well as other functions, behaviors, or capabilities not expressly described. Computing device 1100 includes a processing subsystem 1102, a storage subsystem 1104, a user interface 1106, and/or a communication interface 1108. Computing device 1100 can also include other components (not explicitly shown) such as a battery, power controllers, and other components operable to provide various enhanced capabilities. In various embodiments, computing device 1100 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1104 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1104 can store one or more applications and/or operating system programs to be executed by processing subsystem 1102, including programs to implement some or all operations described above that would be performed using a computer. For example, storage subsystem 1104 can store one or more code modules 1110 for implementing one or more method steps described above.

A firmware and/or software implementation may be implemented with modules (e.g., procedures, functions, and so on). A machine-readable medium tangibly embodying instructions may be used in implementing methodologies described herein. Code modules 1110 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1110) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1110 may comprise sets of instructions (codes) embodied on a computer-readable medium that directs a processor of a computing device 1100 to perform corresponding actions. The instructions may be configured to run in sequential order, in parallel (such as under different processing threads), or in a combination thereof. After loading a code module 1110 on a general purpose computer system, the general purpose computer is transformed into a special purpose computer system.

Computer programs incorporating various features described herein (e.g., in one or more code modules 1110) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1104 can also store information useful for establishing network connections using the communication interface 1108.

User interface 1106 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1106 to invoke the functionality of computing device 1100 and can view and/or hear output from computing device 1100 via output devices of user interface 1106. For some embodiments, the user interface 1106 might not be present (e.g., for a process using an ASIC).

Processing subsystem 1102 can be implemented as one or more processors (e.g., integrated circuits, one or more single-core or multi-core microprocessors, microcontrollers, central processing unit, graphics processing unit, etc.). In operation, processing subsystem 1102 can control the operation of computing device 1100. In some embodiments, processing subsystem 1102 can execute a variety of programs in response to program code and can maintain multiple concurrently executing programs or processes. At a given time, some or all of a program code to be executed can reside in processing subsystem 1102 and/or in storage media, such as storage subsystem 1104. Through programming, processing subsystem 1102 can provide various functionality for computing device 1100. Processing subsystem 1102 can also execute other programs to control other functions of computing device 1100, including programs that may be stored in storage subsystem 1104.

Communication interface 1108 can provide voice and/or data communication capability for computing device 1100. In some embodiments, communication interface 1108 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1108 can provide wired connectivity (e.g., universal serial bus, Ethernet, universal asynchronous receiver/transmitter, etc.) in addition to, or in lieu of, a wireless interface. Communication interface 1108 can be implemented using a combination of hardware (e.g., driver circuits, antennas, modulators/demodulators, encoders/decoders, and other analog and/or digital signal processing circuits) and software components. In some embodiments, communication interface 1108 can support multiple communication channels concurrently. In some embodiments the communication interface 1108 is not used.

It will be appreciated that computing device 1100 is illustrative and that variations and modifications are possible. A computing device can have various functionality not specifically described (e.g., voice communication via cellular telephone networks) and can include components appropriate to such functionality.

Further, while the computing device 1100 is described with reference to particular blocks, it is to be understood that these blocks are defined for convenience of description and are not intended to imply a particular physical arrangement of component parts. For example, the processing subsystem 1102, the storage subsystem, the user interface 1106, and/or the communication interface 1108 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1100.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A peripheral device comprising:
a rotatable member,
wherein the peripheral device is configured to:
receive data of a number of items from an external device;
receive data comprising parameters from the external device; and
adjust a force on the rotatable member according to a resistance profile, wherein the resistance profile is based on the data of the number of items and the parameters.

2. The peripheral device of claim 1, wherein the peripheral device is a computer mouse.

3. The peripheral device of claim 2, wherein the rotatable member is a scroll wheel of the computer mouse.

4. The peripheral device of claim 1, wherein the rotatable member is a knob.

5. The peripheral device of claim 1, wherein the peripheral device is a keyboard.

6. The peripheral device of claim 1, wherein the parameters include a number of ratchet steps per rotation, length of a ratchet step, or a shape of a ratchet step.

7. The peripheral device of claim 1, wherein the data of the number of items is a list of items.

8. The peripheral device of claim 1, wherein the peripheral device is configured to transmit to the computer data of a force applied to the rotatable member.

9. A method comprising:
receiving, at a peripheral device, data of a number of items from an external device;
receiving, at the peripheral device, data comprising parameters from the external device; and
adjusting a force on a rotatable member of the peripheral device according to a resistance profile,
wherein the resistance profile is based on the data of the number of items and the parameters.

10. The method of claim 9 wherein the peripheral device is a computer mouse.

11. The method of claim 10 wherein the rotatable member is a scroll wheel of the computer mouse.

12. The method of claim 9 wherein the parameters include a number of ratchet steps per rotation, length of a ratchet step, or a shape of a ratchet step.

13. The method of claim 9 wherein the data of the number of items is a list of items.

14. The method of claim 9 wherein the peripheral device is configured to transmit to the computer data of a force applied to the rotatable member.

15. The method of claim 9 wherein the rotatable member is a knob.

16. The method of claim 9 wherein the peripheral device is a keyboard.

* * * * *